US008615109B2

(12) United States Patent
Shimizu

(10) Patent No.: US 8,615,109 B2
(45) Date of Patent: Dec. 24, 2013

(54) MOVING OBJECT TRAJECTORY ESTIMATING DEVICE

(75) Inventor: Hiroaki Shimizu, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 281 days.

(21) Appl. No.: 13/157,835

(22) Filed: Jun. 10, 2011

(65) Prior Publication Data

US 2011/0235864 A1 Sep. 29, 2011

Related U.S. Application Data

(63) Continuation of application No. 12/413,659, filed on Mar. 30, 2009, now abandoned.

(30) Foreign Application Priority Data

Apr. 7, 2008 (JP) ................................ 2008-099447

(51) Int. Cl.
*G06K 9/00* (2006.01)

(52) U.S. Cl.
USPC ........... 382/104; 340/901; 340/435; 340/436; 348/118

(58) Field of Classification Search
USPC .......... 382/103, 104; 340/901–905, 435–437; 348/118–120
See application file for complete search history.

(56) References Cited

U.S. PATENT DOCUMENTS 6,353,785 B1 3/2002 Shuman et al.
6,396,535 B1 5/2002 Waters
6,421,463 B1 7/2002 Poggio et al.
6,791,471 B2 9/2004 Wehner et al.
7,298,247 B2 * 11/2007 Shimizu ........................ 340/435
7,610,146 B2 10/2009 Breed
7,639,841 B2 * 12/2009 Zhu et al. ...................... 382/104
7,982,634 B2 * 7/2011 Arrighetti ..................... 340/937
2004/0246114 A1 12/2004 Hahn
2006/0177099 A1 * 8/2006 Zhu et al. ...................... 382/104
2008/0136670 A1 * 6/2008 Tengler et al. ................ 340/905
2010/0020169 A1 * 1/2010 Jang et al. ..................... 348/115
2010/0030472 A1 2/2010 Kindo et al.
2010/0045481 A1 * 2/2010 Tengler et al. ................ 340/902
2012/0268262 A1 * 10/2012 Popovic ........................ 340/438

FOREIGN PATENT DOCUMENTS

DE 10325762 A1 12/2004
JP 2004-145479 A 5/2004
JP 2006285693 10/2006

(Continued)

OTHER PUBLICATIONS

Office Action for U.S. Appl. No. 12/413,659, dated Mar. 10, 2011.

*Primary Examiner* — Aaron W Carter
(74) *Attorney, Agent, or Firm* — Gifford, Krass, Sprinkle, Anderson & Citkowski, P.C.

(57) ABSTRACT

A moving object trajectory estimating device has: a surrounding information acquisition part that acquires information on surroundings of a moving object; a trajectory estimating part that specifies another moving object around the moving object based on the acquired surrounding information and estimates a trajectory of the specified moving object; and a recognition information acquisition part that acquires recognition information on a recognizable area of the specified moving object, and the trajectory estimating part estimates a trajectory of the specified moving object, based on the acquired recognition information of the specified moving object.

8 Claims, 8 Drawing Sheets

(56) References Cited

FOREIGN PATENT DOCUMENTS

JP 2007-140647 A 6/2007
JP 2007-140674 A 6/2007
JP 2007-241729 A 9/2007
JP 2007230454 A 9/2007
JP 2007-264884 A 10/2007

* cited by examiner

MOVING OBJECT TRAJECTORY ESTIMATING DEVICE

CROSS REFERENCE TO RELATED APPLICATIONS

This application is a continuation of abandoned U.S. Patent Application Publication No. 2009/0252380 filed Mar. 30, 2009 which claims priority to Japanese Patent Application No. 2008-099447 filed on Apr. 7, 2008, both of which are herein incorporated by reference in the entirety including the specification, drawings and abstract.

BACKGROUND OF THE INVENTION

1. Field of the Invention

The invention relates to a moving object trajectory estimating device, which estimates the trajectory of a vehicle or other moving object.

2. Description of the Related Art

A moving object trajectory estimating device is described in, for example, Japanese Patent Application Publication No. 2007-230454 (JP-A-2007-230454). The device estimates the trajectory that a specified object out of a plurality of object may follow; changes in positions that the plurality of objects might possibly take with the lapse of time are generated as tracks on a space-time constituted of time and space; uses the tracks to predict the trajectories of the plurality of objects; and, based on the prediction result, quantitatively calculates the degree of interference between the trajectory of the specified object may follow and the trajectories that the other objects may follow.

However, in the moving object trajectory estimating device according to the related art, the estimation is performed in consideration of the movements of the other objects present around the specified object of which the trajectory needs to be estimated. Therefore, the movements of the other objects that are invisible to the specified object are also taken into consideration. As a result, appropriate trajectory estimation might not be performed.

SUMMARY OF THE INVENTION

The invention provides a moving object trajectory estimating device that estimates an appropriate trajectory.

A moving object trajectory estimating device according to the invention includes: a surrounding information acquisition part that acquires information on the surroundings of a moving object; a trajectory estimating part that specifies another moving object around the moving object based on the surrounding information acquired by the surrounding information acquisition part and estimates the trajectory of the specified moving object; and a recognition information acquisition part that acquires recognition information on a recognizable area of the specified moving object, wherein the trajectory estimating part estimates the trajectory of the specified moving object based on the recognition information of the specified moving object acquired by the recognition information acquisition part.

According to this aspect, by estimating the trajectory of the specified moving object based on the recognition information of the specified moving object acquired by the recognition information acquisition part, the trajectory of the specified moving object can be estimated more accurately. Therefore, estimation of the trajectory of the specified moving object from the perspective of the specified moving object allows appropriate trajectory estimation. In addition, because it is not necessary to take into consideration any information other than the information recognized by the specified moving object in this case, the speed of the estimation processing can be improved, and the accuracy of the trajectory estimation can be enhanced. The recognition information here includes not only information that is directly visible to the specified moving object but also information that is not directly visible but can be obtained through communication.

According to this invention, a moving object trajectory estimating device that performs appropriate trajectory estimation can be provided.

BRIEF DESCRIPTION OF THE DRAWINGS

The foregoing and further objects, features and advantages of the invention will become more apparent from the following description of preferred embodiment with reference to the accompanying drawings, in which like numerals are used to represent like elements and wherein.

DETAILED DESCRIPTION OF EMBODIMENTS

Embodiments of the invention will be described in detail below with reference to the accompanying drawings. Note that like numerals are used to represent like elements in the descriptions of the drawings, and overlapping descriptions are omitted.

A moving object trajectory estimating device 1 according to a first embodiment may be applied to a controller of an automatically driven vehicle and estimates the trajectories of other vehicles.

Figure 1:
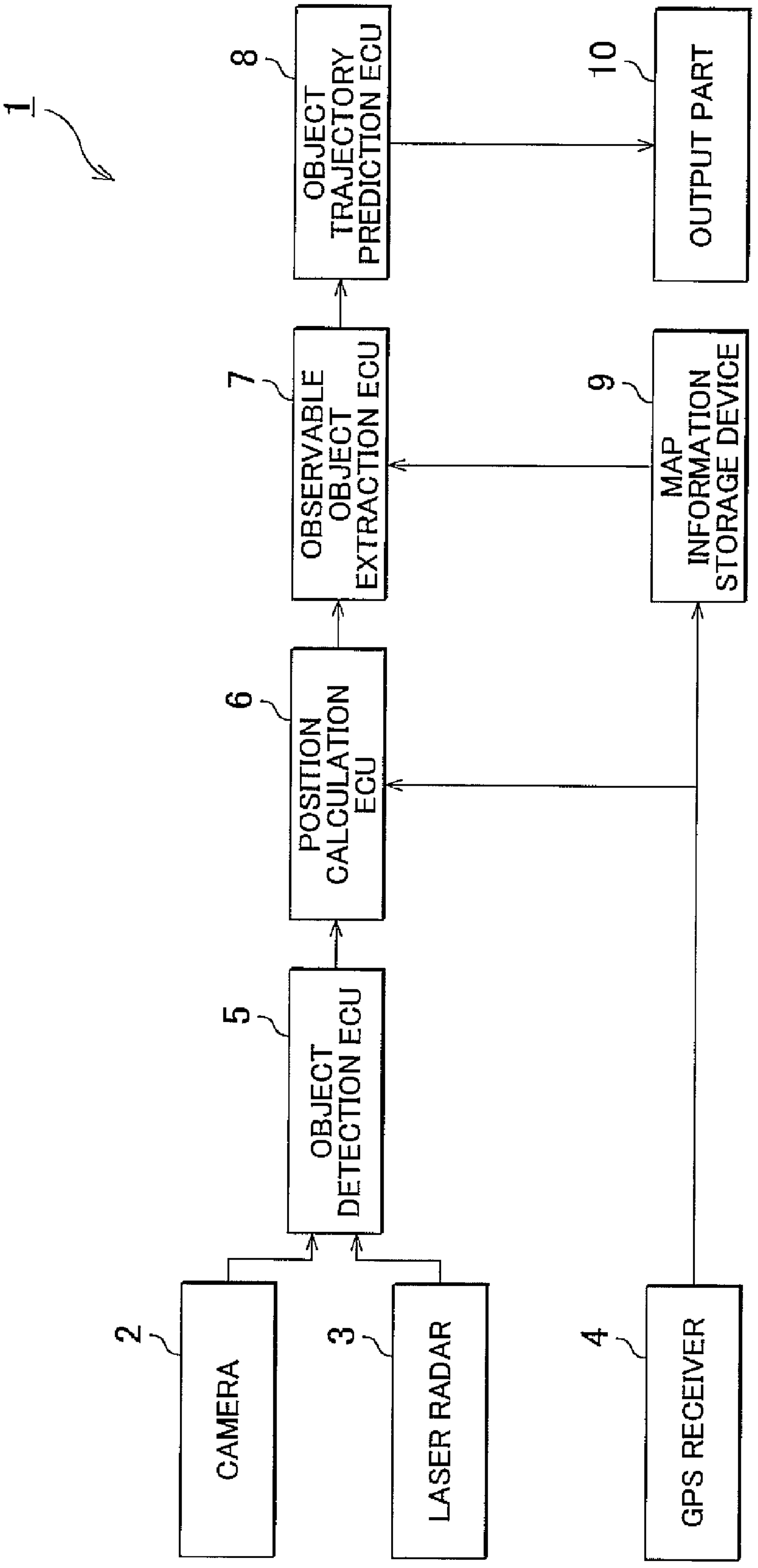
FIG. 1 is a block diagram showing the structure of a moving object trajectory estimating device according to a first embodiment of the invention.

FIG. 1 is a block diagram showing the structure of the moving object trajectory estimating device according to the first embodiment of the invention. As shown in FIG. 1, the moving object trajectory estimating device 1 has an object detection electronic control unit (ECU) 5, position calculation ECU 6, observable object extraction ECU 7, and object trajectory prediction ECU 8. The ECUs each execute their own control and are configured by, for example, a central processing unit (CPU), read only memory (ROM), random access memory (RAM), input signal circuit, output signal circuit, power circuit, and the like. The object detection ECU 5 is connected to a camera 2 and laser radar 3. The position calculation ECU 6 is connected with a global positioning system (GPS) receiver 4.

The camera 2 may be a monocular camera, stereo camera, infrared camera or the like, and is used to acquire a situation around a host vehicle by capturing images of objects such as other vehicles, a pedestrian, roadside object, and the like.

The laser radar 3 transmits a laser beam to surroundings of the host vehicle while scanning in a horizontal direction of the host vehicle, receives a wave reflected from the surface of the other vehicle or pedestrian to detect the distance to as well as the bearing and speed of the other vehicle or pedestrian. The bearing of the other vehicle or pedestrian, the distance to the other vehicle or pedestrian, and the speed of the other vehicle or pedestrian are detected by using the angle of the reflected wave, the time from when an electric wave is emitted till when the reflected wave returns, and changes in the frequency of the reflected wave, respectively.

The GPS receiver 4 receives a GPS satellite signal to determine the position of the host vehicle, and detects the position of the host vehicle based on the received GPS satellite signal. The GPS receiver 4 outputs the determined position of the host vehicle to the position calculation ECU 6.

The object detection ECU 5, the surrounding information acquisition means for acquiring information on the surroundings of the base vehicle, acquires an image signal outputted by the camera 2 and signals of a plurality of other vehicles outputted by the laser radar 3, and detects the plurality of other vehicles. The object detection ECU 5 then outputs the detected other vehicles to the position calculation ECU 6.

The position calculation ECU 6 is connected to the object detection ECU 5, and may specify an object from the plurality of other vehicles detected by the object detection ECU 5. For example, from a plurality of oncoming vehicles traveling in an oncoming lane, the vehicle closest to the host vehicle may be selected. Furthermore, the position calculation ECU 6 calculates the absolute position of a specified vehicle based on information on the specified vehicle (to be referred to as "specified vehicle") and the absolute position of the host vehicle output by the GPS receiver 4. The position calculation ECU 6 then outputs the absolute position calculated for the specified vehicle to the observable object extraction ECU 7.

The observable object extraction ECU 7 is connected to the position calculation ECU 6 and map information storage device 9. Road information or map information including information on a structure around a road is stored in the map information storage device 9. For example, this device reads the map information on the surroundings of the host vehicle based on the signal output by the GPS receiver 4, and outputs the read map information to the observable object extraction ECU 7. Examples of the information on a structure around a road include the shape, length, height and the like of the structure.

The observable object extraction ECU 7, serving as the recognition information acquisition means, extracts an observable object from the specified vehicle based on the absolute position of the specified vehicle output from the position calculation ECU 6 and the map information of the surroundings of the host vehicle that is output from the map information storage device 9. Here, the observable object from the specified vehicle means an object that is visible from the driver's seat of the specified vehicle, and examples of such an object include other vehicles, such as two-wheeled vehicles, pedestrians, etc. The observable object extraction ECU 7 then outputs information on the extracted observable object of the specified vehicle to the object trajectory prediction ECU 8.

The object trajectory prediction ECU 8, the trajectory estimating means, generates a predicted trajectory of each observable object based on the information on the observable object from the specified vehicle extracted by the observable object extraction ECU 7, and predicts the trajectory of the specified object based on the generated result. The object trajectory prediction ECU 8 then outputs the predicted trajectory of the specified object to an output part 10. The output part 10 determines the trajectory of the vehicle in response to, for example, the result of the predicted trajectory of the specified object, and automatically controls a steering actuator or a drive actuator.

Next, an operation of the moving object trajectory estimating device 1 according to the first embodiment is described.

Figure 2:
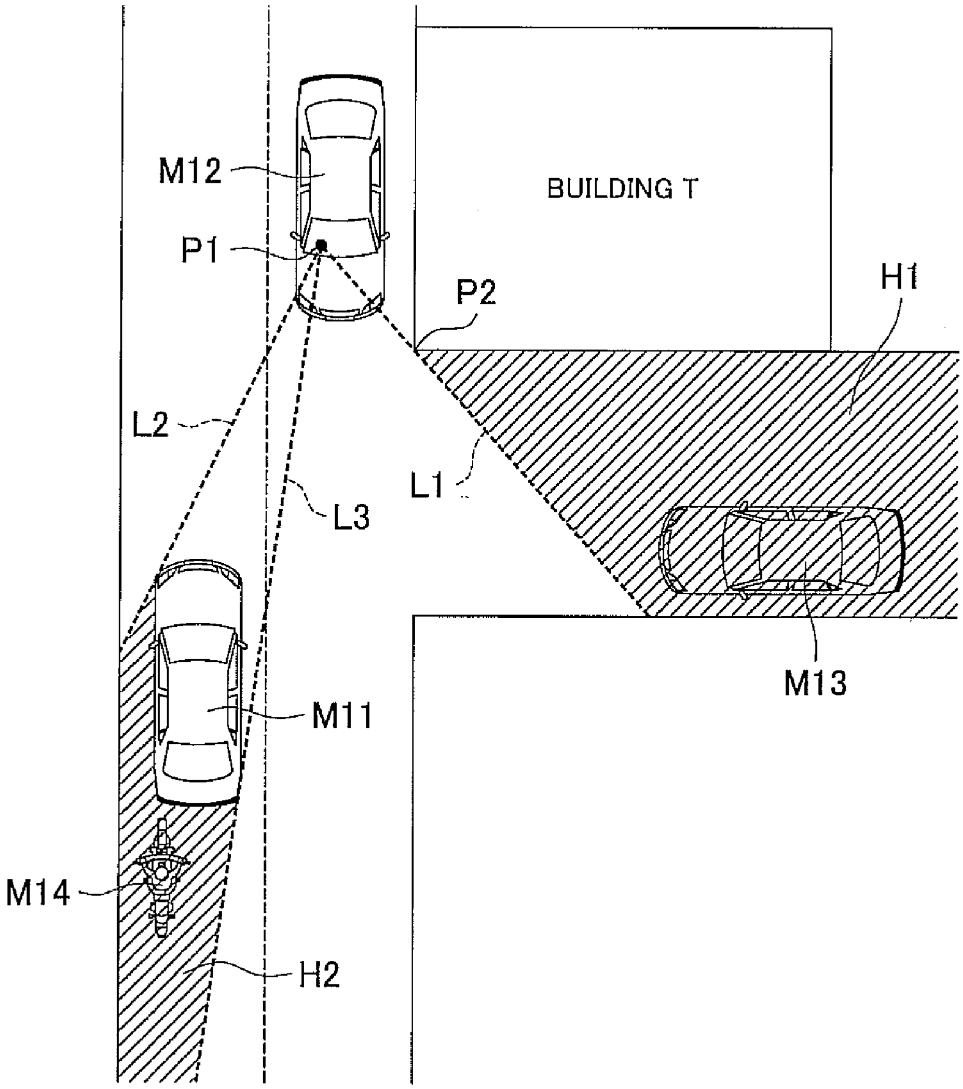
FIG. 2 is an explanatory diagram showing a situation in which the moving object trajectory estimating device according to first and second embodiments of the invention is applied on a T intersection.

FIG. 2 is an explanatory diagram showing a scenario in which the moving object trajectory estimating device according to the first embodiment is applied on a T intersection. As shown in FIG. 2, a host vehicle M11 and an oncoming vehicle M12, which are both equipped with the moving object trajectory estimating device 1, travel in a priority road of a T intersection, and other vehicle M13 travels in a nonpriority road. A motorcycle M14 travels behind the host vehicle M11. A large building T is present at a corner on the left-hand side of the oncoming vehicle M12.

Figure 3:
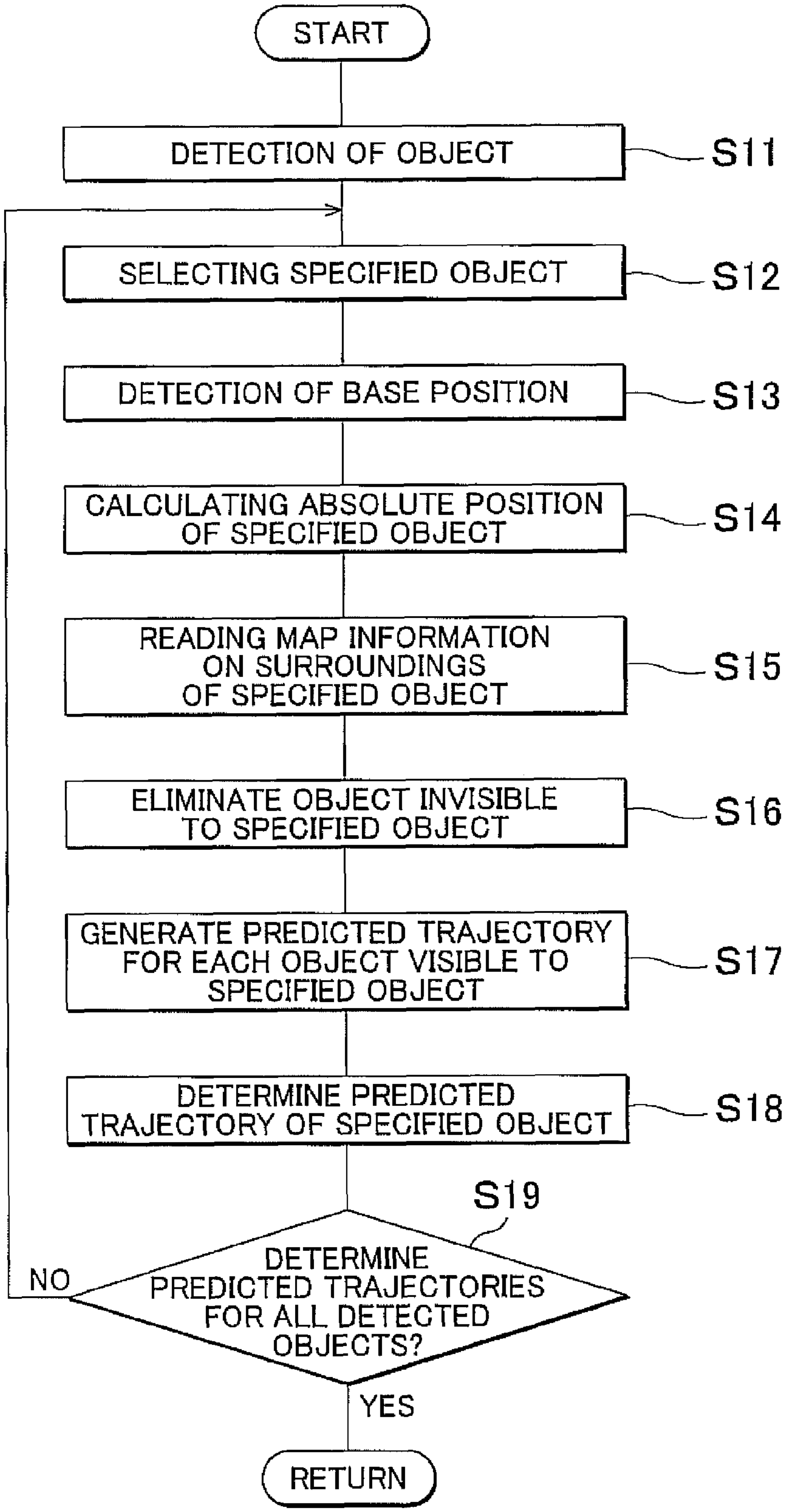
FIG. 3 is a flowchart showing an operation of the moving object trajectory estimating device according to the first embodiment of the invention.

FIG. 3 is a flowchart showing the operation of the moving object trajectory estimating device according to the first embodiment. Control steps shown in FIG. 3 are executed predetermined intervals (e.g., 100 to 1000 ms) after the ignition is turned on.

First, in step S11, objects such as other vehicles or pedestrians around the host vehicle M11 are detected. Any conventional method may be used as the method of this detection. For example, the surroundings of the host vehicle M11 may be scanned using the laser radar 3 to measure the positions of the oncoming vehicle M12, other vehicle M13 and motorcycle M14, and the speed of each of these vehicles is measured based on positional changes occurring in continuous time. Also, objects such as the other vehicle and pedestrian in the surroundings including the oncoming vehicle M12, other vehicle M13 and motor cycle M14 are detected based on the images captured by the camera 2.

Next, in step S12, one object from among the plurality of objects detected in step S11 is selected and a trajectory is predicted. For example, out of a plurality of oncoming vehicles traveling in an oncoming lane, the oncoming vehicle M12 closest to the host vehicle M11 may be selected.

In step S13, a base position is detected based on the GPS satellite signal received by the GPS receiver 4, and the absolute position of the host vehicle M11 is thereby obtained. Next, in step S14, the absolute position of the oncoming vehicle M12 is determined based on the position of the oncoming vehicle M12 relative to the position of the host vehicle M11 and the absolute position of the host vehicle M11.

The map information on the surroundings of the oncoming vehicle M12 is read from the map information storage device 9 in step S15 once the absolute position of the oncoming vehicle M12 has been calculated in step S14. The map information is information with which whether a visual field from the oncoming vehicle M12 is blocked or not by the road structure on the map. The map information includes information on at least the height of the road structure.

In step S16, it is determined whether, from the perspective of the oncoming vehicle M12, other surrounding object is blocked by the road structure or not, eliminates a blocked invisible object, and extracts only objects that are not blocked. Specifically, when the oncoming vehicle M12 is selected as the specified object, as shown in FIG. 2, whether other object is visible to the oncoming vehicle M12 or not is determined.

Thus, for example, by drawing a straight line L1 passing from the driver's seat P1 of the oncoming vehicle M12 to a top point P2 of a corner of the building T, the visual field on the left-hand side of the straight line L is blocked by the building T, whereby a blocked area H1 is formed. It is determined that the other vehicle M13 is not visible to the oncoming vehicle M12, because the other vehicle M13 is positioned within this blocked area H1. On the other hand, it is determined that the host vehicle M11 is visible to the oncoming vehicle M12, because there is no object between the host vehicle M11 and the oncoming vehicle M12.

Furthermore, when drawing straight lines L2, L3 passing from the driver's seat P1 of the oncoming vehicle M12 to right and left ends of the host vehicle M11 from the perspective of the driver's seat P1, the section between the straight lines L1 and L2 and behind the host vehicle M11 is blocked by the host vehicle M11, thereby forming a blocked area H2. It is determined that the motorcycle M14 is not visible to the oncoming vehicle M12, because the motorcycle M14 is positioned within the blocked area H2. Therefore, only the host vehicle M11 is the object visible to the oncoming vehicle M12. The other vehicle M13 and the motorcycle M14 are then eliminated, but the host vehicle M11 is extracted.

In step S17, a predicted trajectory of the object extracted in step S16 is generated. Because only the host vehicle M11 is extracted in step S16, a predicted trajectory of the host vehicle M11 is generated. Here, because the host vehicle M11 appears merely as an object to the oncoming vehicle M12, the trajectory generation is carried out using the same method as with the other object, regardless of the trajectory followed by the host vehicle M11. Note that any conventional method may be used as the trajectory generation method. Examples of such a method include a method for stochastically expressing the tracks of the positions that sequentially change with the lapse of time.

Step S18 determines a predicted trajectory of the specified object. Specifically, a predicted trajectory of the oncoming vehicle M12 is determined based on the predicted trajectory of other objects around the oncoming vehicle M12 (i.e., the host vehicle M11) that is generated in step S17. Note that any conventional method may be used as this trajectory determination method. Examples of one such method include a method for reducing the probability that a track that the oncoming vehicle M12 and the host vehicle M11 interfere with each other is taken.

In step S19 it is determined whether the predicted trajectories for all of the detected objects should be determined. The other vehicle M13 and the motorcycle M14 are sequentially selected after the predicted trajectory of the oncoming vehicle M12 is determined, and the trajectories of these objects are generated by repeatedly performing the above-described steps. Then, the series of control steps is ended after determining the predicted trajectories of all of the detected objects.

As described above, according to the moving object trajectory estimating device 1 of the first embodiment, because the oncoming vehicle M12, other vehicle M13 and motorcycle M14 are selected to estimate the predicted trajectories thereof based on the recognition information of these vehicles, the predicted trajectories are estimated more accurately. Appropriate estimation may be performed by estimating a predicted trajectory of a vehicle from the perspective of the oncoming vehicle M12, other vehicle M13 and motorcycle M14. Furthermore, because it is not necessary to take into consideration any information other than the recognizable range of the vehicles, not only is it possible to reduce the amount of estimation processing needed, but also the speed of the estimation processing may be improved, to enhance the accuracy of the trajectory estimation.

A trajectory estimating method for a moving object according to a second embodiment of the invention is described next.

Figure 4:
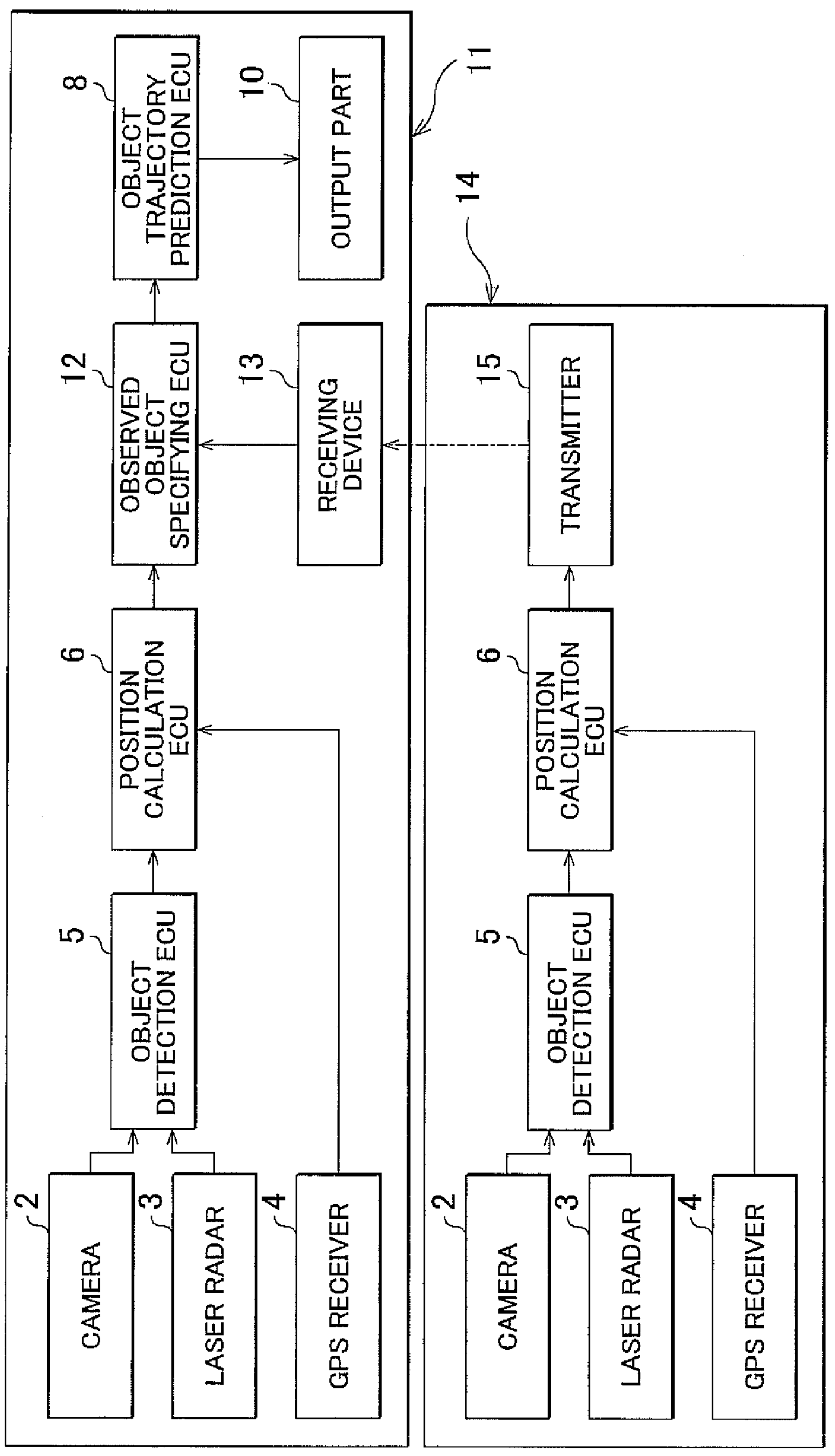
FIG. 4 is a block diagram showing the structure of a moving object trajectory estimating device according to the second embodiment of the invention.

FIG. 4 is a block diagram showing the structure of a moving object trajectory estimating device according to the second embodiment. As shown in FIG. 4, a trajectory estimating method for a moving object 11 according to the second embodiment differs from the moving object trajectory estimating device 1 according to the first embodiment in that the trajectory estimating method for a moving object 11 has an observed object specifying ECU 12 and receiving device 13. Specifically, the moving object trajectory estimating device 11 has the object detection ECU 5, position calculation ECU 6, observed object specifying ECU 12, and object trajectory prediction ECU 8, and the receiving device 13 is connected with the observed object specifying ECU 12.

The receiving device 13 communicates with other vehicles around a host vehicle. For example, the receiving device 13 receives vehicle information from oncoming vehicles traveling in an oncoming lane and a vehicle following the host vehicle (including two-wheel vehicles). The receiving device 13 then outputs the received information on the other vehicles to the observed object specifying ECU 12.

The observed object specifying ECU 12, which serves as the recognition information acquisition means, is provided between the position calculation ECU 6 and the object trajectory prediction ECU 8. The observed object specifying ECU 12 specifies an observed object of a specified vehicle based on the absolute position of the specified vehicle output from the position calculation ECU 6 and the information on the specified vehicle output from the receiving device 13. Here, the observed object from the specified vehicle may an object visible from the driver's seat of the specified vehicle, and examples of such an object include other vehicles, such as a two-wheel vehicle, a pedestrian, etc. The observed object specifying ECU 12 outputs the information regarding the specified observed object of the specified vehicle to the object trajectory prediction ECU 8.

On the other hand, a controller 14 installed in the other vehicle that communicates with the host vehicle may be configured by, for example, the camera 2, laser radar 3, GPS receiver 4, object detection ECU 5, position calculation ECU 6, and a transmitter 15. The transmitter 15 is connected with the position calculation ECU 6 and transmits the calculated absolute position and base position of the surrounding other vehicle.

Next, an operation of the moving object trajectory estimating device 11 according to the second embodiment will be described. The operation is described below is based on the scenario shown in FIG. 2.

Figure 5:
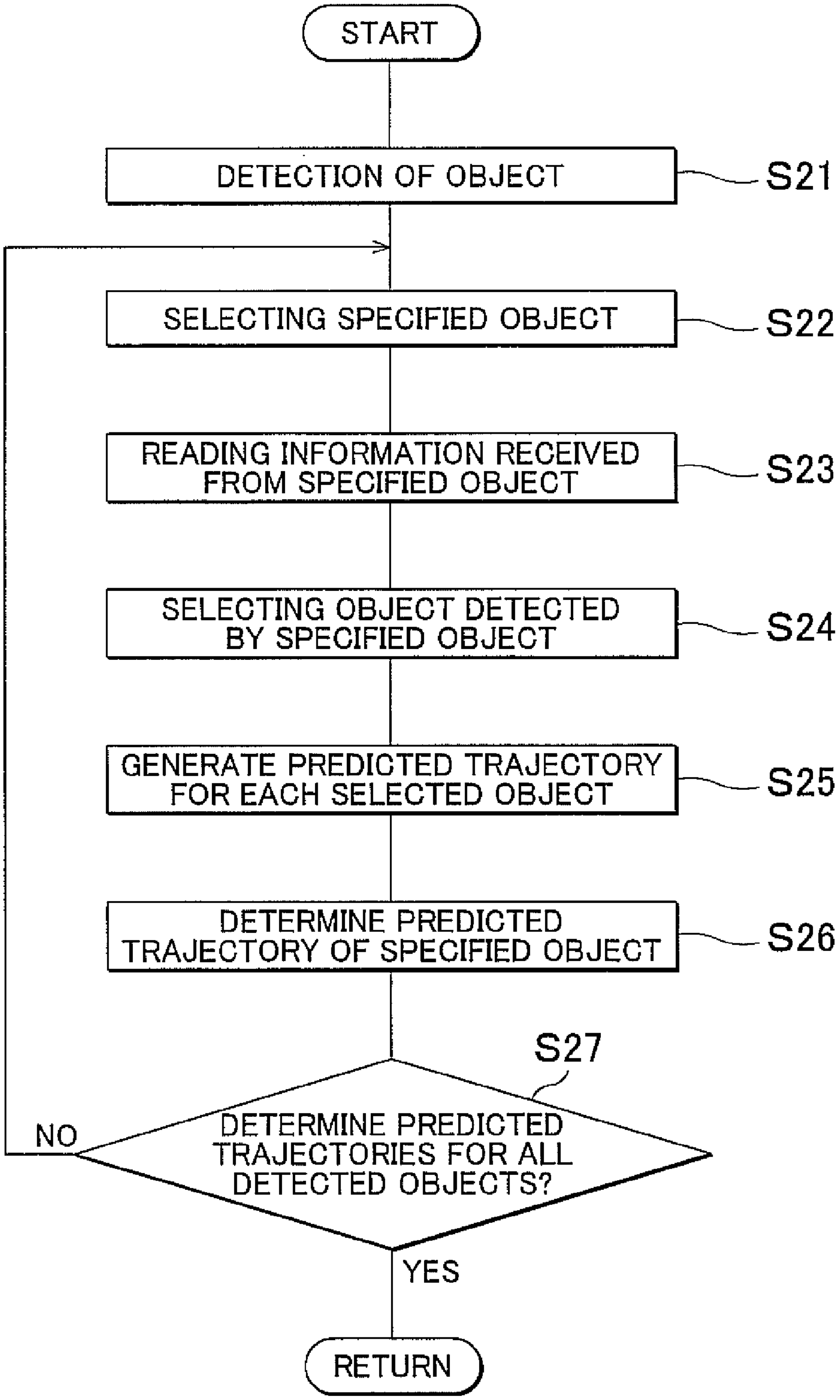
FIG. 5 is a flowchart showing an operation of the moving object trajectory estimating device according to the second embodiment of the invention.

FIG. 5 is a flowchart showing an operation of the moving object trajectory estimating device according to the second embodiment. The control steps shown in FIG. 5 are executed predetermined intervals (e.g., 100 to 1000 ms) after the ignition is turned on.

First, step S21 detects an object such as other vehicle or a pedestrian around the host vehicle M11. An existing method may be used as the method of this detection. For example, the surroundings of the host vehicle M11 may be scanned using the laser radar 3 to determine the positions of the oncoming vehicle M12, other vehicle M13 and of motorcycle M14, and the speed of each of these vehicles may be measured based on positional changes that occur over time. In addition, objects such as the other vehicle and pedestrian in the surroundings including the oncoming vehicle M12, other vehicle M13 and motor cycle M14 are detected based on the images captured by the camera 2.

In step S22 selects one specified object trajectory from the plurality of vehicles detected in step S21 and the trajectory of the selected object is predicted. For example, out of a plurality of oncoming vehicles traveling in an oncoming lane, the oncoming vehicle M12 closest to the host vehicle M11 is selected.

In the process of S23 the information received from the oncoming vehicle M12 is read. The information includes the information of the oncoming vehicle M12 and objects detected by the oncoming vehicle M12. The objects detected by the oncoming vehicle M12 include not only those objects that are directly observed by the oncoming vehicle M12, but also those objects that cannot directly observed by the oncoming vehicle M12 but may be obtained through inter-vehicle communication. In the situation shown in FIG. 2, although the other vehicle M13 and motorcycle M14 cannot be directly observed from the oncoming vehicle M12 because the other vehicle M13 and motorcycle M14 are positioned within the blocked areas H1, H2, respectively, the oncoming vehicle M12 can detect these vehicles by means of inter-vehicle communication between the other vehicle M13 and the motorcycle M14.

Step S24 selects, from the objects detected by the oncoming vehicle M12, an object that can be observed by the oncoming vehicle M12. In the situation shown in FIG. 2, because the object that can be observed by the oncoming vehicle M12 is the host vehicle M11 only, the host vehicle M11 is selected.

The predicted trajectory of the object selected in step S24 is then generated in step S25. Because only the host vehicle M11 is selected, the predicted trajectory of the host vehicle M11 is generated. Note that any conventional method may be used as the trajectory generation method. Examples of such a method include a method for stochastically expressing the tracks of the positions that sequentially change with the lapse of time.

Steps S26 and S27 are the same as those of S18 and S19 of the first embodiment described above, accordingly overlapping descriptions are omitted. Then, the series of control steps ends after determining the predicted trajectories of for each detected object.

As described above, according to the moving object trajectory estimating device 11 of the second embodiment, not only is it possible to obtain the same operational effects as those obtained by the moving object trajectory estimating device 1 according to the first embodiment, but also to obtain the information on the observable objects from the oncoming vehicle M12 via communication with the oncoming vehicle M12. Therefore, the trajectories that the oncoming vehicle M12 may take are more accurately estimated, and appropriate trajectory estimation can be performed.

Next, a moving object trajectory estimating device according to a third embodiment of the invention will be described.

Figure 6:
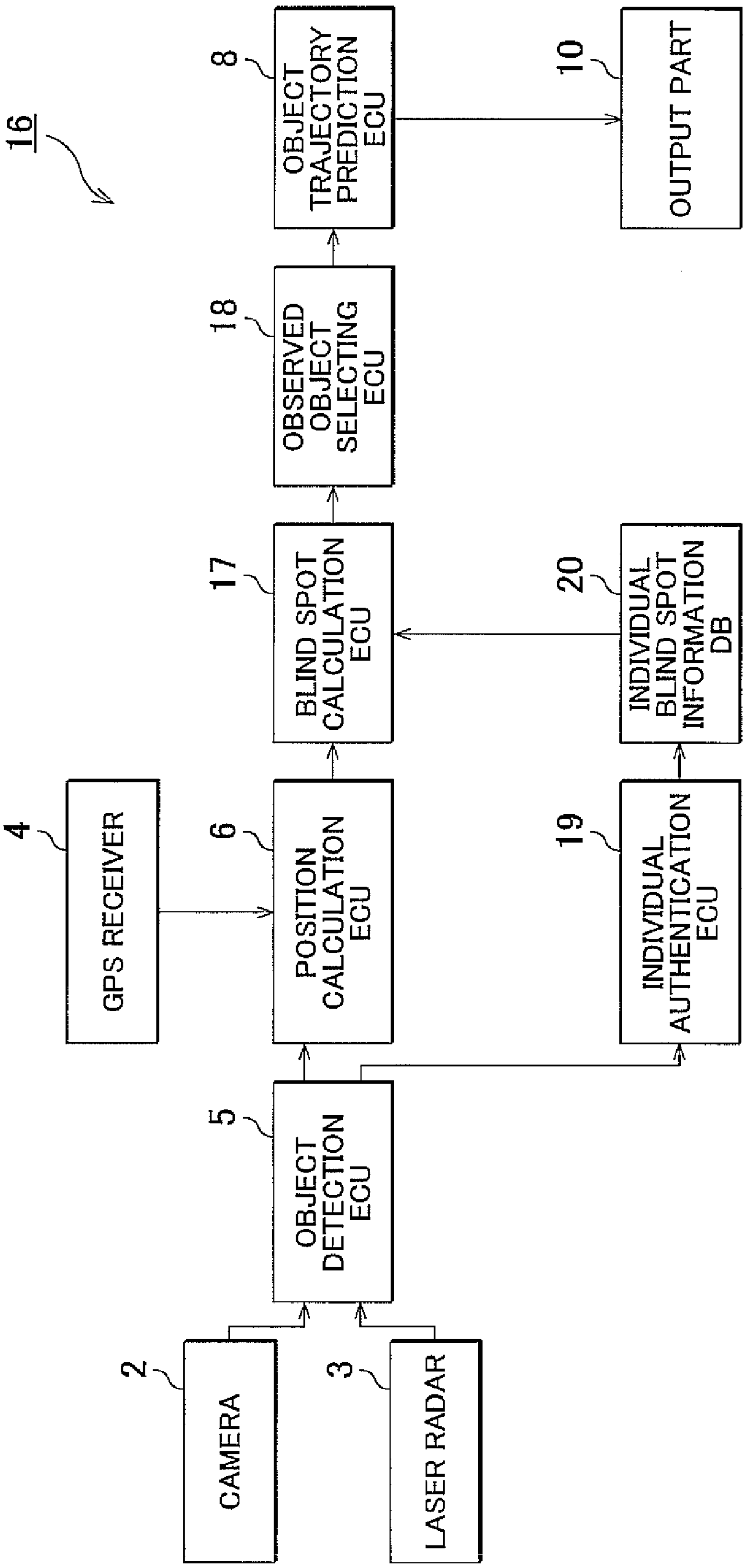
FIG. 6 is a block diagram showing the structure of a moving object trajectory estimating device according to a third embodiment of the invention.

FIG. 6 is a block diagram showing the structure of the moving object trajectory estimating device according to the third embodiment. As shown in FIG. 6, a trajectory estimating method for a moving object 16 according to the third embodiment differs from the moving object trajectory estimating device 1 according to the first embodiment in that the trajectory estimating method for a moving object 16 includes a blind spot calculation ECU 17, observed object selecting ECU 18, individual authentication ECU 19, and individual blind spot information database (DB) 20.

The individual authentication ECU 19 is connected to the object detection ECU 5 and performs individual authentication on the plurality of other vehicles detected by the object detection ECU 5. For example, the individual authentication ECU 19 authenticates the vehicle model by reading an image or license plate of the other vehicle captured by the camera 2. Blind spot information for each vehicle model is stored in the individual blind spot information DB 20. The individual blind spot information DB 20 is connected to the individual authentication ECU 19, so that blind spot information unique to a vehicle is extracted in accordance with the result of vehicle model output by the individual authentication ECU 19. The individual authentication ECU 19 then outputs the extracted blind spot information to the blind spot calculation ECU 17.

The blind spot calculation ECU 17 is connected to the individual blind spot information DB 20 and the position calculation ECU 6, and calculates the blind spot of the specified vehicle based on the blind spot information for the vehicle that is output from the individual blind spot information DB 20 and the absolute position of the specified vehicle that is output from the position calculation ECU 6. The blind spot calculation ECU 17 then outputs the calculated blind spot of the specified vehicle to the observed object selecting ECU 18. The observed object selecting ECU 18, which serves as the recognition information acquisition means, selects an object that is not present in the blind spot of the specified vehicle and can be observed from the specified vehicle, based on the results of the blind spot of the specified vehicle in the area that is output from the blind spot of calculation ECU 17. The observed object selecting ECU 18 then outputs the selected result to the object trajectory prediction ECU 8.

Next, the operation of the moving object trajectory estimating device 16 according to the third embodiment is described.

Figure 7:
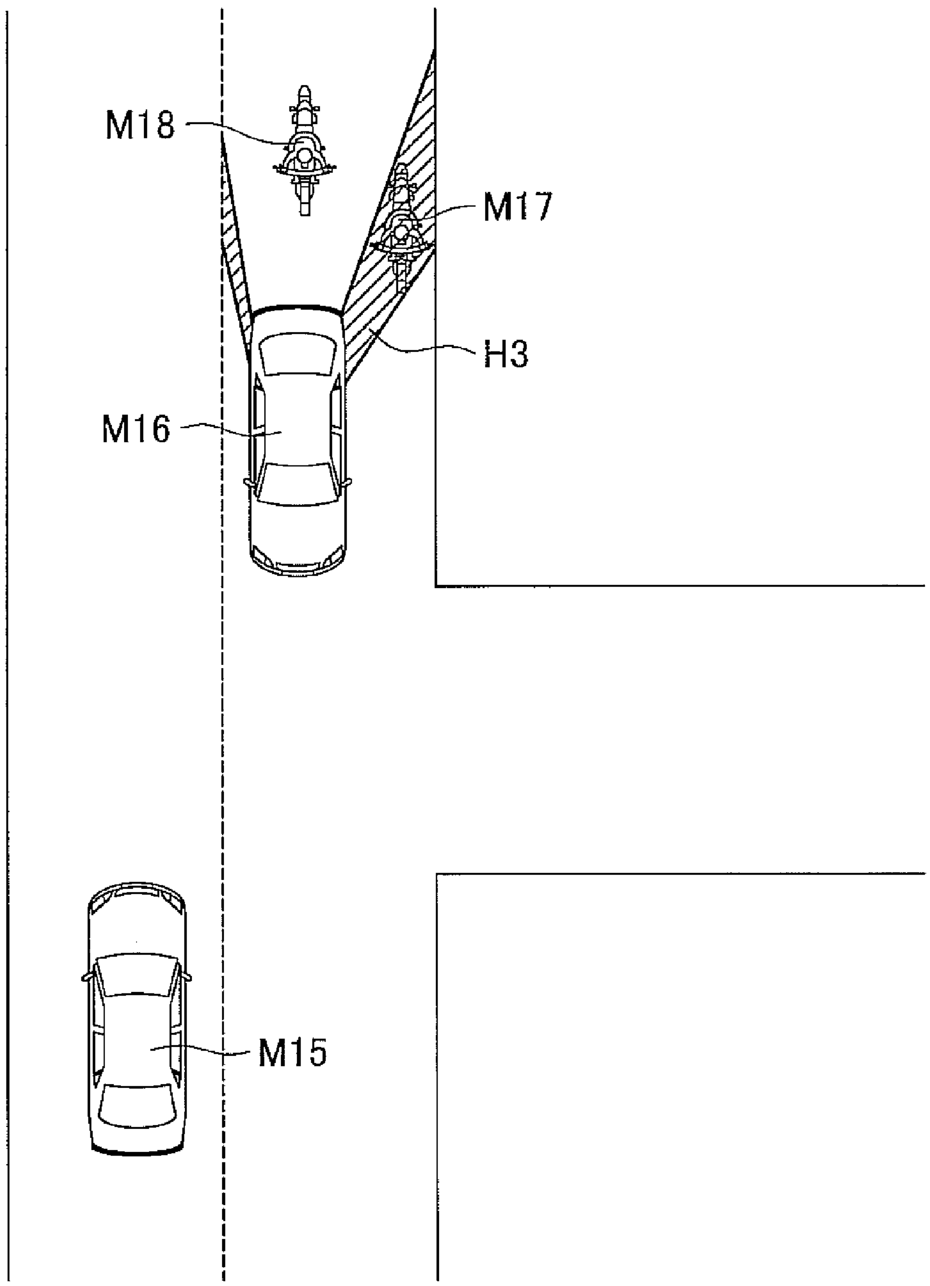
FIG. 7 is an explanatory diagram showing a situation in which the moving object trajectory estimating device according to the third embodiment of the invention is applied at a T intersection.

FIG. 7 is an explanatory diagram showing a scenario in which the moving object trajectory estimating device according to the third embodiment of the invention is applied on a T intersection. As shown in FIG. 7, a host vehicle M15 and an oncoming vehicle M16, which that are both equipped with the moving object trajectory estimating device 16, travel in a priority road of a T intersection, and motorcycles M17 and M18 travel on the left-hand side of the oncoming vehicle M16 and behind the oncoming vehicle M16 respectively. The motorcycle M17 is located within a blind spot of the oncoming vehicle M16 in area H3.

Figure 8:
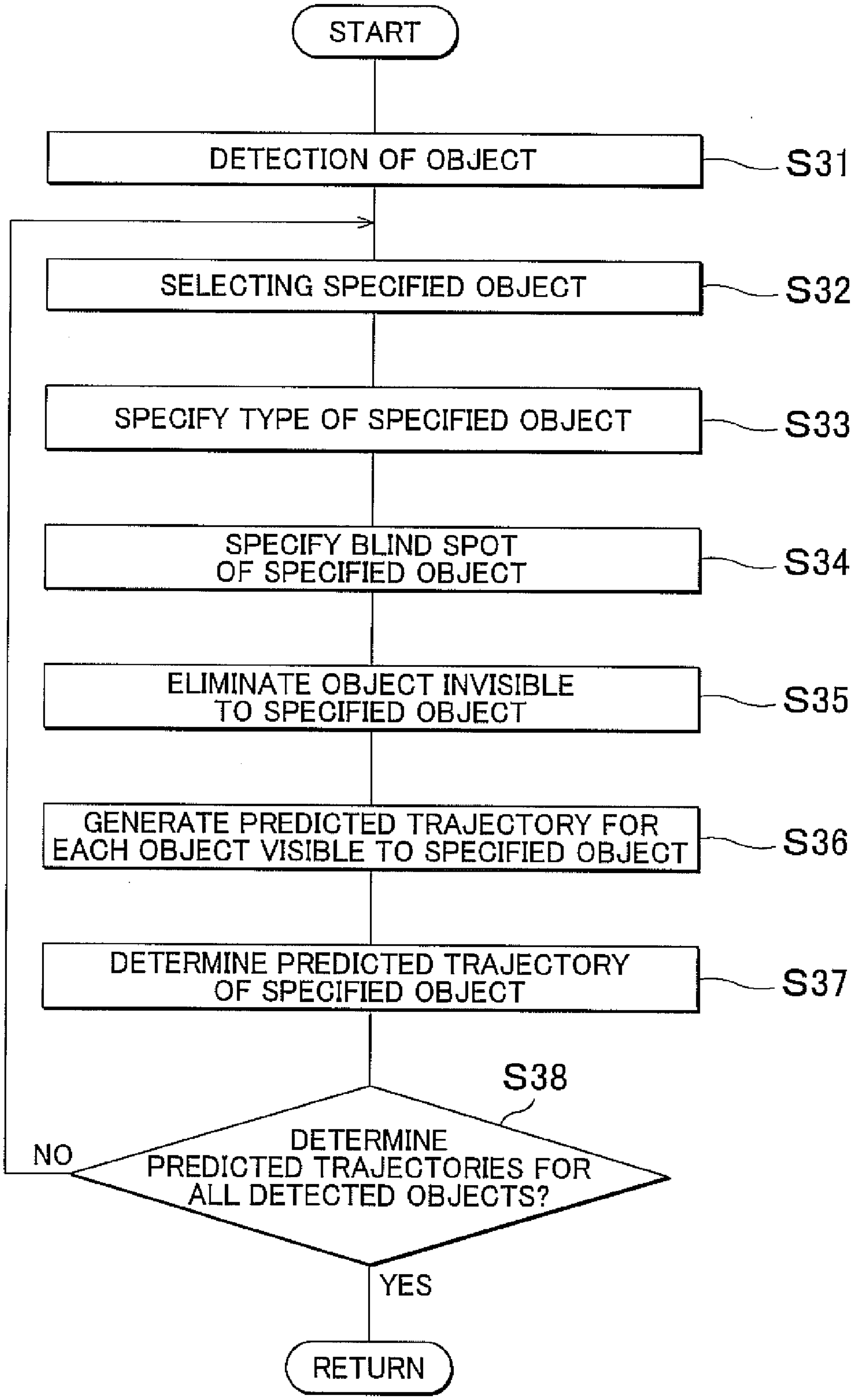
FIG. 8 is a flowchart showing an operation of the moving object trajectory estimating device according to the third embodiment of the invention.

FIG. 8 is a flowchart showing an operation of the moving object trajectory estimating device according to the third embodiment. The control steps shown in FIG. 8 are executed at predetermined intervals (e.g., 100 to 1000 ms) after the ignition is turned on.

First, in step S31, objects such as other vehicles or pedestrians around the host vehicle M15 are detected. Conventional methods may be used as the method of this detection. For example, the surroundings of the host vehicle M15 may be scanned using the laser radar 3 to measure the positions of the oncoming vehicle M16 and motorcycles M17, M18, and the speed of the oncoming vehicle M16 and motorcycles M17, M18 may be measured based on positional changes occurring over time. Also, the oncoming vehicle M16 and motorcycles M17, M18 are detected based on the images captured by the camera 2.

In step S32, the object from the plurality of objects detected in step S31, for which the trajectory is predicted, is then selected. For example, out of a plurality of oncoming vehicles traveling in an oncoming lane, the oncoming vehicle M16 closest to the host vehicle M15 is selected.

Then in step S33, specified individual information of the oncoming vehicle M16 selected in step S32. For example, the vehicle model of the oncoming vehicle M16 is specified. A general method may be used as the method for specifying the vehicle model. For example, based on an image of the oncoming vehicle M16 captured by the camera 2, the vehicle model is specified through pattern matching of the image, or the license plate is read, to specify the appropriate vehicle model in the database.

Next in step S34, the blind spot information for the vehicle model of the oncoming vehicle M16 is read from the individual blind spot information DB 20 in accordance with the individual information of the oncoming vehicle M16 specified in step S33, and then specifies a blind spot. For example, as shown in FIG. 7, the blind spot H3 of the oncoming vehicle M16 is specified.

Then, the objects present in the blind spot specified in step S34 are eliminated in step S35, and only the objects that are not present in the blind spot are extracted. In FIG. 7, although the host vehicle M15 and motorcycle M18 are visible to the oncoming vehicle M16, the motorcycle M17 located within the blind spot H3 is not visible to the oncoming vehicle M16.

In step S36, a predicted trajectory of the objects visible to the oncoming vehicle M16 are generated. Because the host vehicle M15 and motorcycle M18 are extracted in step S35, the predicted trajectories of the host vehicle M15 and motorcycle M18 are generated. Note that any conventional method may be used as the trajectory generation method. Examples include stochastically expressing the tracks of the positions that sequentially change over time.

Step S37 subsequent to step S36 determines the predicted trajectory of the specified object. Specifically, the predicted trajectory of the oncoming vehicle M16 is determined based on the predicted trajectories of the host vehicle M15 and motorcycle M18 generated in step S36. Note that any conventional method may be used as this trajectory determination method. Examples include reducing the probability that a track that the oncoming vehicle M16 interferes with the host vehicle M15 and motorcycle M18 is taken.

In step S38, it is determined whether to determine the predicted trajectories for all of the detected objects. The motorcycles M17, M18 are sequentially selected after the predicted trajectory of the oncoming vehicle M16 is determined, and the trajectory of each motorcycle M17, M18 is generated in accordance with the above-described steps. Then, the series of control steps is ended after determining the predicted trajectories of each detected object.

As described above, according to the moving object trajectory estimating device 16 of the third embodiment, not only is it possible to obtain the same operational effects as those of the moving object trajectory estimating device 1 according to the first embodiment, but it is also possible to specify the blind spot unique to the oncoming vehicle M16 in accordance with the individual information of the oncoming vehicle M16 and to eliminate the objects contained in the blind spot. Therefore, the trajectories that may be taken by the oncoming vehicle M16 are estimated more accurately, and appropriate trajectory estimation can be performed.

In the third embodiment, the observed object selecting ECU 18 not only specifies the objects that can be observed from the specified vehicle, based on the blind spot of the specified vehicle, but also may specify an object that can be observed from each object, from detection capability information provided to the specified vehicle. The detection capability information may include the type and presence/absence of a sensor installed in each object, the capability of each sensor to detect an observable distance or observable environment, blind spot, visual field, and the like.

In addition, examples of methods for specifying a vehicle model include reading a license plate or processing the images and then acquiring the vehicle model from the database as described above, and acquiring the vehicle model by means of direct communication. Moreover, the individual information of the vehicle model does not necessarily have to be the vehicle model information, instead the size of the vehicle or the pillar position information may be acquired by the camera or via communication.

Note that the embodiments described above are merely examples of the moving object trajectory estimating device according to the invention. The moving object trajectory estimating device according to the invention is not limited to those described in the embodiments. For example, the moving object trajectory estimating device according to the invention may be applied to not only in the automatic operation of a vehicle, but also in predicting and warning about the movement of other moving body, as well as a robot.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. A moving object trajectory estimating device, comprising:

a surrounding information acquisition sensor that acquires information on surroundings of a moving object;

a trajectory estimating electronic control unit that specifies another moving object around the moving object based on the surrounding information acquired by the surrounding information acquisition sensor; and a recognition information acquisition electronic control unit that acquires recognition information on a recognizable area for the specified moving object based on at least one of (i) information which is received from the specified moving object through communication with the specified moving object, or which is stored in a database in the moving object, and (ii) shape information of a structure around a road, wherein the trajectory estimating electronic control unit estimates a trajectory of the specified moving object based on the recognition information on the recognizable area of the specified moving object acquired by the recognition information acquisition electronic control unit.

2. The moving object trajectory estimating device according to claim 1, wherein the recognition information acquisition electronic control unit acquires, from the specified moving object, information that includes the recognizable area.

3. The moving object trajectory estimating device according to claim 2, wherein the recognition information acquisition electronic control unit acquires information that includes the recognizable area for the specified moving object, based on individual information on the specified moving object.

4. The moving object trajectory estimating device according to claim 3, wherein the moving object is a vehicle.

5. The moving object trajectory estimating device according to claim 4, wherein the specified moving object is a vehicle.

6. The moving object trajectory estimating device according to claim 5, wherein the recognizable area of the specified moving object is a visible area of the specified moving object.

7. The moving object trajectory estimating device according to claim 6, wherein the individual information on the specified moving object is individual blind spot information on the specified moving object.

8. The moving object trajectory estimating device according to claim 1, wherein the shape information of the structure around the road includes information on a height of the structure around the road.

* * * * *